Figure 1:
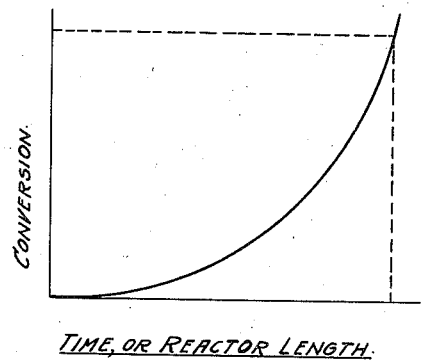

April 3, 1951

R. R. WENNER 2,547,916

MULTISTAGE CONTINUOUS REACTION PROCESS
FOR THE PRODUCTION OF VINYL ACETATE

Filed Oct. 16, 1946

5 Sheets-Sheet 1

INVENTOR.
RALPH R. WENNER.
BY

April 3, 1951

R. R. WENNER 2,547,916

MULTISTAGE CONTINUOUS REACTION PROCESS
FOR THE PRODUCTION OF VINYL ACETATE

Filed Oct. 16, 1946

5 Sheets-Sheet 4

INVENTOR.
RALPH R. WENNER.
BY
Herbert J Chase

April 3, 1951
R. R. WENNER
2,547,916
MULTISTAGE CONTINUOUS REACTION PROCESS
FOR THE PRODUCTION OF VINYL ACETATE
Filed Oct. 16, 1946
5 Sheets-Sheet 5
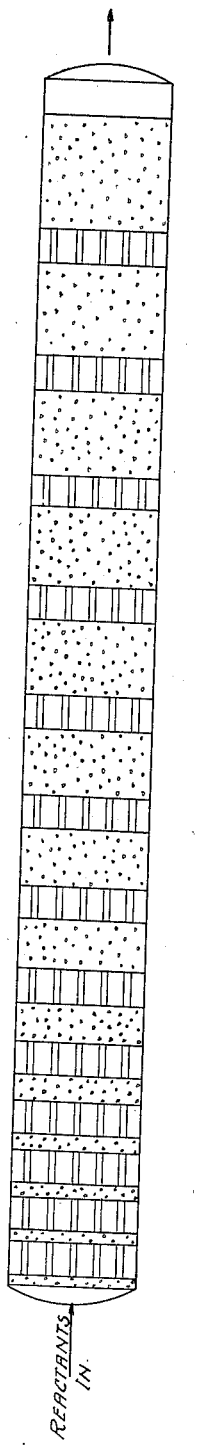
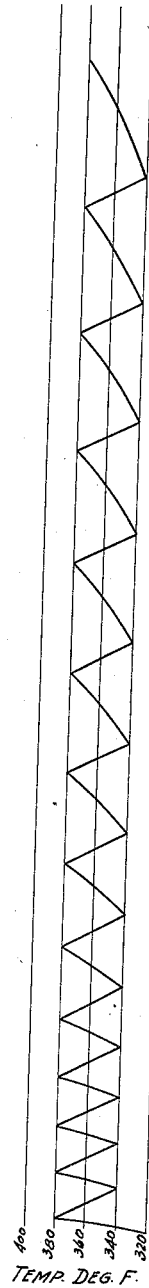
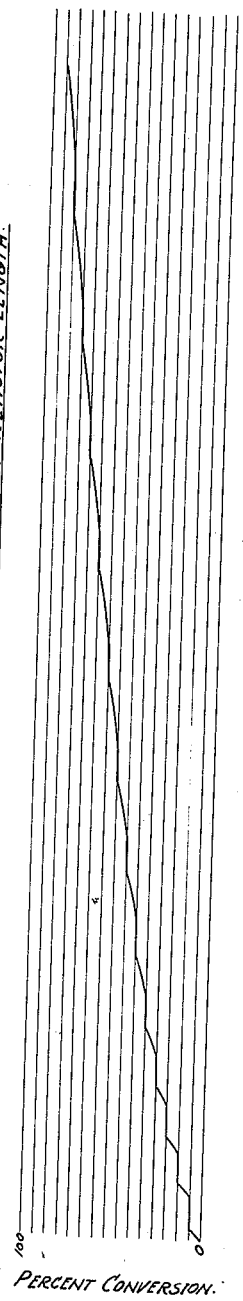
Fig. 7.
INVENTOR.
RALPH R. WENNER
BY Patented Apr. 3, 1951

2,547,916

UNITED STATES PATENT OFFICE 2,547,916

MULTISTAGE CONTINUOUS REACTION PROCESS FOR THE PRODUCTION OF VINYL ACETATE

Ralph R. Wenner, West Carrollton, Ohio, assignor to Monsanto Chemical Company, St. Louis, Mo., a corporation of Delaware Application October 16, 1946, Serial No. 703,539

6 Claims. (Cl. 260—498)

This invention relates to a process by which chemical reactions, otherwise very difficult to control, may be performed in a safe and economical manner. It is well known that many chemical reactions are of the runaway type, and hence are dangerous to perform, because the reactions, when once initiated, cannot be brought under control, but go quickly to the production of undesirable end products which may be gases having far larger volumes than the original reactants. When this condition in addition is attended by the production of heat, an explosion may occur, resulting in the destruction of an expensive catalyst, and sometimes even in the complete destruction of the chemical equipment.

It is an object of the invention to provide a control means for rapid exothermic reactions, and particularly for those having rapidly accelerated rates of reaction. Competing reactions are also readily controlled for industrial purposes by the present process. Examples of this type of reaction may, with proper control, produce useful products, but may also be subject to other competing reactions, either from the same starting materials or as the result of intermediate reactions which likewise can result in destructive and explosive results.

A specific object of the present invention is to apply a control means to the vinylation reaction. An example is the production of vinyl esters such as vinyl acetate by the catalytic reaction of acetylene and acetic acid. The presence of the exceedingly reactive constituents of this system renders it of extreme necessity to be able to control the convertive reaction, since the compounds involved introduce the possibility of undesirable side reactions with resulting uneconomical losses of raw material and product.

I have discovered that satisfactory conversion and yields can be obtained in spite of the rapidly rising temperatures encountered in exothermic reactions by controlling the extent of conversion. My process of control recognizes the difficulty of maintaining constant reaction velocity in the catalyst zone, and instead of trying to arrive at a compromise value between a dangerously high rate, and a safe, but uneconomically low one, operates instead to secure reaction rates within a controlled range. This is achieved by processing with alternate acceleration and deceleration zones. Hence, the reaction may be initiated at a desirably moderate temperature, and then before a dangerously high temperature condition is reached, deceleration by cooling is applied, after which the acceleration of the reaction may be repeated to bring the reaction conversion to any desired ultimate level. Operation, according to my invention, avoids the difficulties of control previously mentioned and furnishes a degree of flexibility and safety, together with longer catalyst life than obtainable heretofore.

The type of reactions generally contemplated involve addition reactions, condensations, and metathetical changes without the use of elemental starting materials like free oxygen or hydrogen as principal reactant constituents. Thus, I may refer to such reactions under the general designation of non-oxidative reactions.

It is old in the art of chemical processing to control oxidation and nitration reactions by means of cooling coils built into reaction kettles, or exposed to reactant materials, or else to provide a limiting control on the reaction by drowning or dumping the entire reaction mass when necessary for safety reasons. It is also known in the oxidation and cracking of hydrocarbons that quick quenching may be utilized to stop a reaction short of an undesirable range. However, it is pointed out that such prior methods differ from the instant invention in that the present teaching provides a continuous, multi-stage, catalytic reaction method in which it is not necessary to abstract any intermediate or completed products until the reaction conduit has been completely traversed.

The present process also differentiates from dehydrogenation reactions with heat exchange in that my invention provides positive stepwise control of the rate of reaction and the conversion as functions of the temperature. In the case of endothermic reactions such as dehydrogenation, less difficulty of control or danger of runaway reaction is likely since, in such a case, the rate of reaction is limited by the rate at which heat can be transferred from a source of heat to the reaction mass. Consequently, while the present method of operation might be used for dehydrogenation reactions, it would not require the full accuracy of controlling the rate and extent of conversion of a dangerous reaction, since these conditions are not inherent in endothermic reactions. However, in general, my stepwise control process now enables a higher level of operations to be carried on because the positive control method permits the reaction to approach closer to the danger zone, but without danger of loss of control.

The process of the invention may be carried out with catalytic reactors of various types utilizing one or more vessels to provide series flow through differential reactor segments or zones, having between them cooling means to provide a continuous flow system. The use of a differential reactor system is in contrast to operations with an integral reactor which is the usual type wherein the entire reaction takes place in one unitary portion of the catalyst zone of the system. In a differential reactor, the catalytic portion is divided into segments, so that only a part of the overall reaction occurs in each differential segment. The integral reactor tends more nearly to approach an isothermal reaction system, whereas in the differential reactor the reaction zone operates under substantially adiabatic conditions. Hence, operations with a differential reactor may be carried out with a definite distribution of temperatures to provide a lower initial temperature, with a gradual increment to provide a stronger driving force for the end of the system, which would otherwise be far less productive.

Since the exothermic heat of reaction is given off at higher rates in the initial stages of the reaction, because of the higher concentration of reactants in said stages, it is a part of the invention to provide smaller masses of catalysts in the earlier portions of the reactor system, followed by gradually increasing masses, so proportioned as to bring the heat liberation or conversion increment to substantially the same level in subsequent zones.

My process makes it possible to utilize solid, surface-active contact catalyst masses of high activity. Thus, while prior art methods have found it necessary to make use of solid, inert bodies or partially spent catalysts in the most active stages of multi-zone reactors, such expedients are not necessary in the instant teaching. While I may utilize more than one type of catalyst in the reactor conduit, I prefer to use the same type in each of the plurality of differential portions of the reaction zones serially arranged. The reactor proper may be comprised of differential segments of catalyst zones intermediate between which are deceleration or cooling zones. Flexibility of control is possible in the practice of the invention to control the magnitude of the deceleration. This permits individual adjustments to be made for variations in catalyst activity as is met in practice in different catalyst batches. Small changes in the operating temperature used in the process will also compensate for catalyst activity variations.

The catalyst reaction zone utilized may be a single conduit in which spaced catalyst sections or zones are provided to make use of the stepwise reaction process of the invention which may, therefore, be considered a differential method with cooling sections being provided between the reaction zones. Hence, a reactor embodying the present method of operation may suitably be constructed in one or more vessels, to provide sufficient length and diameter of catalyst conduit to accomplish the desired degree of conversion, and to achieve the desired production. The present invention, however, is not limited to any particular type of converter, since the process claimed may be applied in various embodiments.

Variation of the time of catalyst contact or sojourn time of the reactants in the respective catalytic segments may also be accomplished by providing successively longer catalytic segments in the direction of reactant flow through the catalyst conduit. Hence, the increment of production, and consequently the exothermic heat output, may be made substantially equivalent in the several zones. Operation in this manner permits of a simplified cooling method, since the successive cooling zones may be made practically identical, resulting in simpler control.

The present process is also distinguished in that it is unnecessary to withdraw or add material anywhere along the length of the catalytic zone. Whereas some processes which utilize gaseous reactants find it necessary to remove conversion products as formed, or else to quench final products to prevent further reactions, I can control the temperature ranges in all parts of the reactor conduit to maintain the reactants and products in a safe condition in which dangerous and runaway reactions are prevented from occurring, and which consequently obviates the necessity of withdrawing or adding materials in the catalytic reaction zones or portions thereof.

The following descriptive examples of applications of the invention will serve to illustrate its utility in general terms, but said examples should not be construed as limitaitons thereof.

In the accompanying drawings which illustrate certain fundamental principles, together with preferred embodiments of the invention:

Fig. 1 is a graphic representation of the relationship of the underlying physico-chemical basis of the invention. The figure shows a plot of the reaction rate of a typical catalytic, thermally accelerated reaction, and presents the usual relationship between conversion and time, the latter being directly expressed on the abscissa as passage through the reactor.

Figure 2:
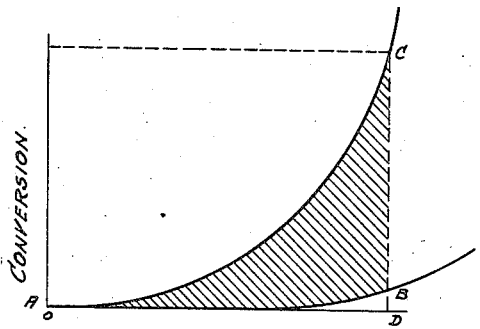

Fig. 2 illustrates the further embodiment of the present teaching, whereby the method of the invention is applied to the case of two competing reactions, the line A—C representing the conversion obtained with the desired reaction, and A—B representing the conversion obtained by the undesired or competing reaction. In the case of Fig. 2 it is pointed out that a zone of possible operation of the desired chemical process may be defined by the zone ACD. The region selected is that in which the desired reaction to produce the desired products may reach an optimum and yet does not permit the undesirable or competing reaction to extend to any appreciable or substantial extent.

Figure 3:
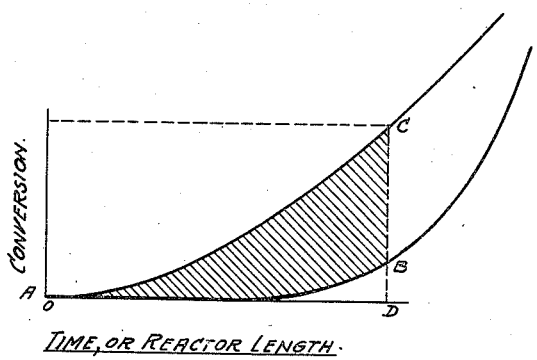

Fig. 3 illustrates another case of competing reactions and shows a region ACD similar to the case of Fig. 2, in which a commercial reaction may be carried out with safety. This case illustrates the desired reaction, AC, together with a competing undesirable reaction, AB, which latter accelerates with extreme rapidity. Here it would not be possible to operate at high conversions without the control method of my process, since the production zone is too close to the danger zone.

Figure 4:
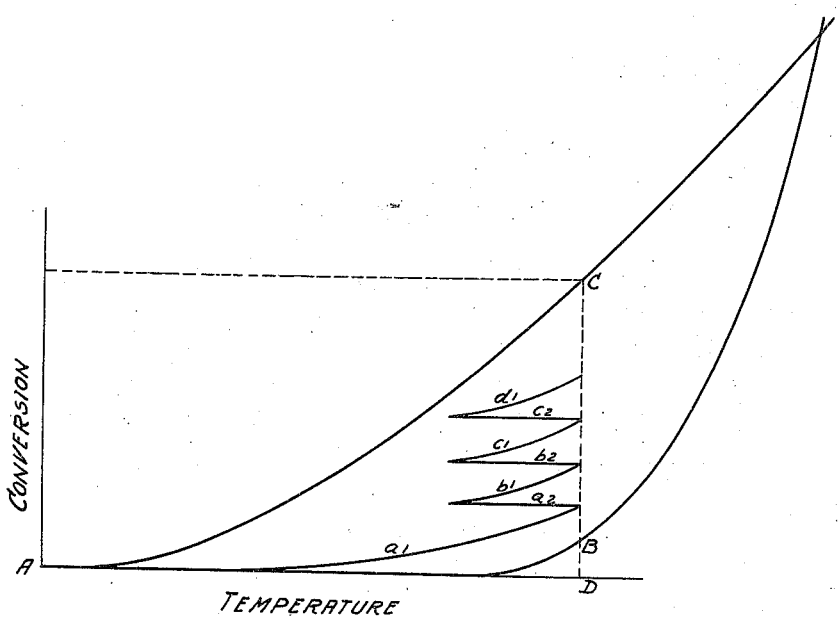

Fig. 4 is also a representation of the dynamics of the chemical reaction system. As provided by my invention, the relationship of conversion and temperature is illustrated in this figure, which shows a desired reaction curve, AC, and an undesired competing reaction curve, AB. The zone of operation for the process of my invention is within the region ACD. Here, I may utilize my stepwise or multi-stage reaction method to carry the reaction to the economic level, and yet take advantage of the positive control means here provided. It may be seen that the preferred zone of operations, ACD, is such as to produce considerable conversion of the desired product without allowing the undesired reaction to proceed to any substantial extent.

The gaseous constituents are allowed to react in the first differential segment of the catalytic zone with the resultant conversion approximated by the curve $a_1$. This continues until the exothermic temperature rise brings the temperature up to the approximate value C. At this time the deceleration or cooling is applied as the gases stream through the reactor as represented by the curve $a_2$, which corresponds to such degree of cooling as is available by conventional heat exchange, leaving the conversion substantially unchanged. Continuing in Fig. 4 with the representation of the catalytic reaction, the curve $b_1$, which represents an acceleration of the reaction continues until the temperature reaches approximately C. The next step in the process is again cooling, corresponding to about $b_2$, after which reaction follows curve $c_1$ and subsequent cooling $c_2$. One of the latter stages of the reaction is exemplified by the curve $d_1$, which brings the reaction closer to the economic or desirable state, as represented by the overall conversion curve AC. The extent of the individual steps is not necessarily limited to exact numerical values, but is in the region approximated by the above values, which are, therefore, given in general terms.

Suitable regulation of temperature in accordance with the process of the instant invention can be determined readily by inspection of temperatures within the reactor. Thermocouples situated in various parts of the reactor enable controls to be set or maintained automatically to provide cooling as required to carry out my process. Thus, the interstage cooling provided to mitigate the exothermic heat of reaction may be adjusted for operation under the particular reaction conditions necessary to obtain a desired throughput with a certain catalyst. The present method is also employed to advantage in connection with automatic control instruments, which may be set to maintain reaction conditions within an optimum zone, such as that of region ACD of Fig. 4. While automatic control to maintain cooling to arrest the reaction is desirable, it is not an essential part of the present invention.

By way of example, the present reaction is directed to the vinylation process in which acetylene is reacted with aliphatic or aromatic acids to produce vinyl esters; as an example of the latter class, benzoic acid may be employed. The examples discussed below relate particularly to vinyl esters, since this is a commercially important embodiment; the fatty acids and their chloride derivatives generally, such as formic, propionic, butyric, caproic, crotonic acids and the like, may be employed for vinylation. Catalysts for this reaction comprise zinc or cadmium salts of the corresponding acids on carriers, for example, activated carbon, alumina and other porous bodies. Zinc acetate on activated carbon has been used commercially in the vinyl acetate reaction which is usually carried on at one to two atmospheres pressure and at 250–600° C. The process may be operated on a once-through or recycle basis.

Figure 5:
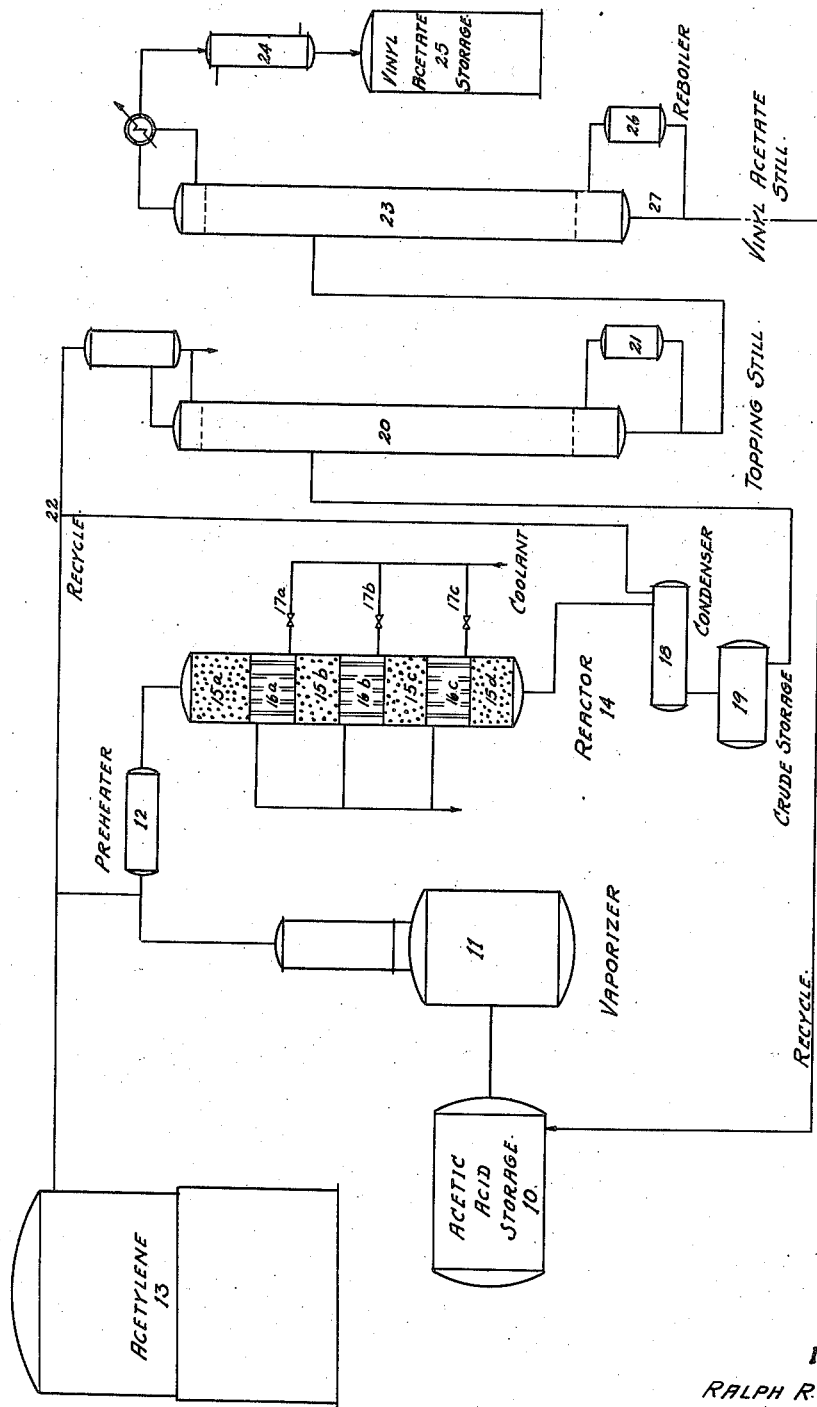

Fig. 5 shows in diagrammatic manner the apparatus and a flow sheet of the process of the vinyl acetate embodiment of the invention using the present reactor system. In this figure, 10 represents the acetic acid storage, from which acetic acid is pumped to vaporizer 11 and then to preheater 12. Here, acetylene from a storage tank or generator tank 13 is mixed with the acetic acid vapor to provide a gas stream charge for reactor 14. The reactor is provided with differential catalyst segments such as 15a, 15b, 15c and 15d. Situated between these catalyst segments are cooling zones 16a, 16b, and 16c, which are subject to individual control, respectively, by control means 17a, 17b, and 17c, corresponding to the particular cooling zones. The liquid products drawn from the reactor are condensed in condenser 18 and then go to the crude storage tank 19.

Also leaving condenser 18 is a gas stream of any uncondensed acetylene, which is recycled to the acetylene supply. The crude liquid accumulated in storage vessel 19 also contains dissolved acetylene which is removed overhead from the topping still 20. Such overhead gas, after removal of the major portion of condensibles, is also recycled by means of the recycle line 22.

Finishing operations in Fig. 5 include the topping still 20 having heating means 21, and the vinyl acetate still 23 provided with a reboiler 26. The vinyl acetate still 23 gives an overhead product comprising principally vinyl acetate, which is condensed in condenser 24, and held in vinyl acetate storage tank 25. The vinyl acetate still also provides a bottoms stream 27 which, after proper purification, may be recycled with the acetic acid charge.

In order that the invention may be clearly understood and readily carried into effect, some practical methods of carrying out the vinyl acetate embodiment according to the instant teaching will now be described in somewhat greater detail by way of example.

*Example 1*

Figure 6:
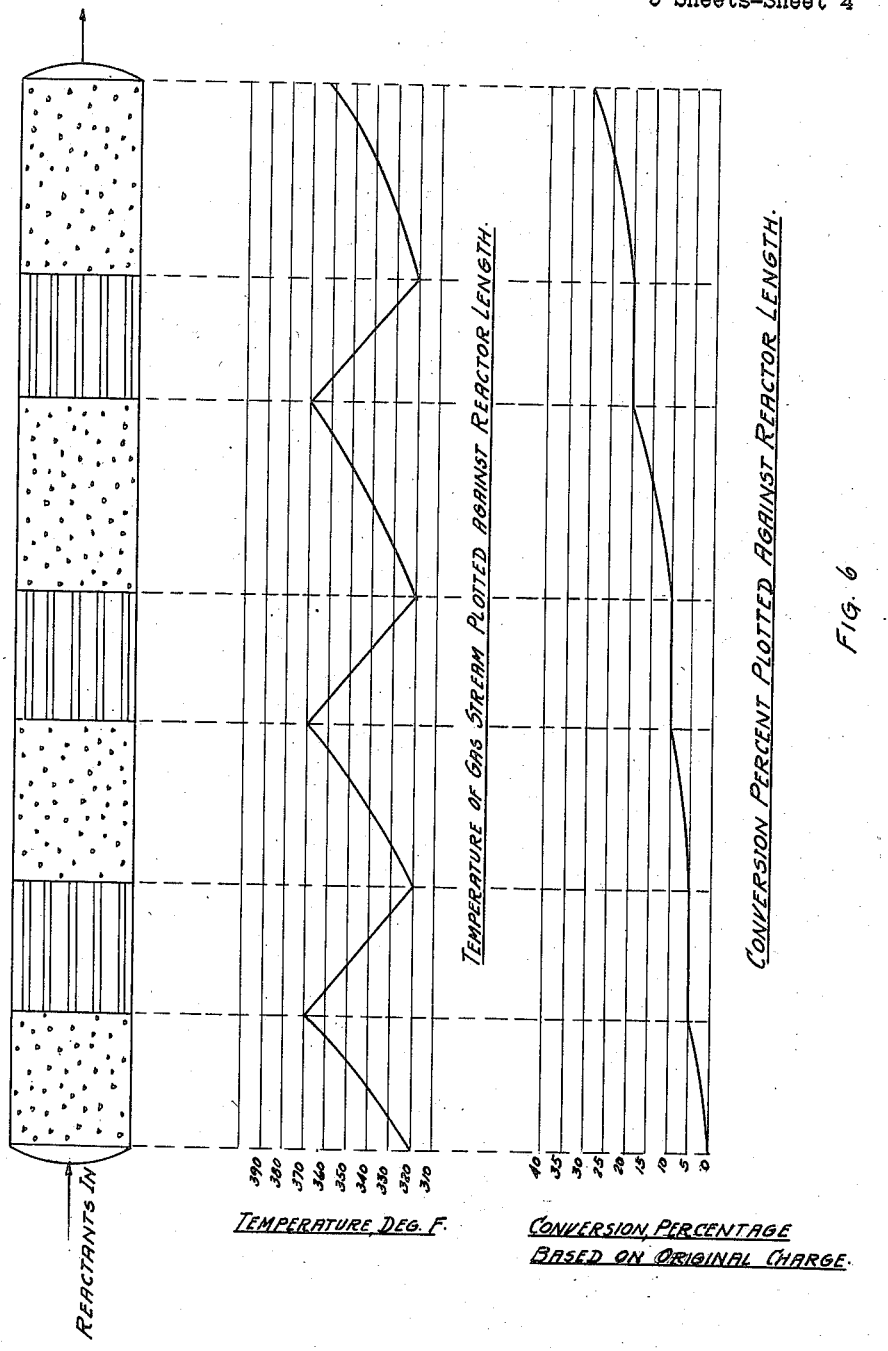

The embodiment of this vinylation reaction is illustrated in Fig. 6 which shows a 4-stage commercial reactor as used in the production of vinyl acetate. This example makes use of four reaction zones serially arranged to form reactor-arrestor units. The accompanying curves, correlated with material flow through the reaction conduit, show that the conversion proceeds with the production of vinyl acetate in the first reactor, and that the subsequent intercooler then arrests the reaction. However, the succeeding catalytic zones again accelerate the production of the desired compound, followed by arresting stages between catalytic stages, to effectuate conversion to such level as may be desired. The medium range of conversion shown by the curves of Fig. 6 are particularly suited as operating conditions for a recycle system.

In vinylation, the principal competing reaction, which the present method reduces in severity, is the decomposition of acetylene. Such a reaction does not start until higher temperatures are reached, but when once initiated, proceeds with explosive violence.

The limits which are placed upon any single cyclic unit may be defined in terms of the heat produced by the chemical reaction or as a temperature rise per unit length of the reactor system. Consideration of the mass velocity of flowing reactants enables a correlation to be expressed of these factors so that the desired reaction may, at all times, be maintained within a safe zone by indirect heat exchange periodically along the length of the catalyst conduit. Thus, I have determined that the heat release in B. t. u.'s per square foot of catalyst cross section should not exceed twenty-five times the mass velocity in conducting vinyl acetate production. The mass velocity is expressed as the total pounds of gas flowing through one square foot of catalyst bed per hour.

The limits which are placed on any single cyclic unit are determined by:

(1) The actual peak temperature in the catalyst bed which is considered to be the economic maximum from the standpoint of yield and overall life of the catalyst, being generally maintained under 600° F., and by (2) The attainment of a certain maximum rate of temperature rise per unit length of catalyst bed ($dT/dl$) which is considered to be the maximum safe rate of temperature increase and which will still permit control of the reaction system. It has been found that the maximum temperature rise which can be used is 100° F. per foot of catalyst conduit length for exothermic vinylation reactions.

In other words, the rate of temperature rise in the vinylation case may become so great that it will not be possible by means of any of the usual cooling apparatus to check the temperature rise, with the result that spontaneous decomposition of the acetylene into the elements may occur. Since this process liberates 3700 B. t. u.'s per pound of acetylene decomposed, in comparison to the vinyl acetate heat release of 470 B. t. u.'s per pound, it is obvious that an explosion may result.

The range of conditions within which economic and safe operation may be performed may be computed from the correlated rate of vinylation data in the presence of a catalyst by the following means:

The instantaneous rate of formation of vinyl acetate $d(VA)/dt$ in any elementary zone of the catalyst bed in which the average temperature is T and the partial pressures of the acetylene and acetic acid are $P_1$ and $P_2$ is given by an expression of the form (1) $$\frac{d(VA)}{dt} = k(P_1)(P_2)$$

This equation is equivalent to the relation (2) $$\frac{dX}{dL} = k_1(r-X)(1-X)$$

where $dx/dL$ represents the rate of change of the acetic acid conversion per foot of catalyst bed length and $r$ represents the mole ratio of acetylene to acetic acid in the charge gas. The constant $k_1$ is a function of the specific activity of the catalyst, the cross sectional area of the catalyst bed, the pressure in the bed, the flow rate (a mass velocity) and the temperature, T.

Since, in the safe region of operation, the principal thermal effect is the heat liberated by the vinylation reaction, 470 B. t. u.'s per pound of vinyl acetate formed, it follows that the rate of temperature rise at any section in an adiabatic catalyst bed must be proportional to the rate of vinylation; hence (3) $$\frac{dT}{dL} = \frac{CdX}{dL}$$

where the constant C is a function of the flow rate, composition and thermal properties of the charge gas and the heat of vinylation. The total heat generated in each cycle in vinyl acetate production is preferably maintained in the range of 25 to 33 B. t. u.'s per pound of reactant vapors.

From the above it follows that once having determined the dependence of the constant $k_1$ (for a specific catalyst) on the temperature and mass velocity, it is possible to calculate the rate of change of conversion and rate of temperature rise with distance in a catalyst bed when the conditions at the entrance to the bed are specified. In this way, it is possible to map the course of the conversions and temperatures along the length of the catalyst bed for various preheat temperatures and flow rates. Thus, the cycle of temperatures and lengths of catalyst zones required to effect a predetermined overall conversion and heat release are readily calculable in advance of operation.

The relationships here involved in the production of vinyl acetate may also be expressed in the form of the heat release per unit length, degrees F. per foot of length of catalyst bed conduit in the derived equation, $$\frac{dT}{dL} = \frac{N_A}{C} \frac{(40{,}400)}{G} \frac{dX}{dL}$$

corresponding to the removal of heat in multiple stages of reaction and deceleration, whereby the maximum instantaneous rate of heat evolution in any stage in maintained below the value of $$\frac{dT}{dL} = 100$$

in the relationship $$\frac{dT}{dL} = \frac{N_A}{C} \frac{(40{,}400)}{G} \frac{dX}{dL}$$

where $N_A$ represents the pound moles of acetic acid entering per square foot of cross section of catalyst bed, C represents the mean specific heat of the reactant gases, G is the mass velocity, $$\frac{dX}{dL}$$

is the instantaneous rate of increase of conversion per unit length of catalyst bed, represented by the tangent at any point of the curve of conversion plotted against the time or reactor length, and $$\frac{dT}{dL}$$

is the instantaneous temperature rise expressed as degrees F. per foot of length of catalyst bed conduit.

The competing reactions taking place in even simple systems may introduce various by-products and undesirable effects. For example, the above catalytic reaction of acetic acid and acetylene produces principally vinyl acetate.

1 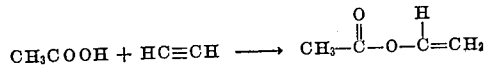

but the following reactions may also occur:

2     $2CH_3COOH \rightarrow (CH_3)_2CO + H_2O + CO_2$

3     $C_2H_2 + H_2O \rightarrow CH_3CHO$

4     $2C_2H_2 + H_2O \rightarrow CH_3CH=CH-CHO$

5     $CH_3COOH + CH_3COO-CH=CH_2 \rightarrow$ $(CH_3COO)_2CH-CH_3$

6     $XC_2H_2 \rightarrow (C_2H_2)_x$

7     $C_2H_2 \rightarrow H_2 + 2C$

The desired reaction (No. 1) predominates at lower temperatures, but since commercially practicable yields of vinyl acetate require higher temperatures, the other reactions (Nos. 2 to 6) may increase in magnitude. The last reaction is particularly dangerous, since it releases 3700 B.t.u.'s per pound of acetylene, and if once started proceeds directly to an explosion.

Example 2

It is shown in Fig. 7 how a 14-stage, continuous process of vinylation may be carried out to produce extremely high conversion of acetylene to vinyl acetate. In this case, the catalytic zones are coordinated with the desired conversion in each of the planned stages, so that the reaction may be safely carried to an economical result. The fourteen reactor or catalytic zones with inter-coolers are followed by the usual condenser system and finishing operations. Here again, the principal competing reaction is one of decomposition of the acetylene.

It has been found, as shown above, that other competing reactions occurring in the vinylation process are the production of aldehydes such as acetaldehyde and crotonaldehyde. The present process enables such side reactions to be controlled whether they occur upon the initial materials or upon intermediates formed in the chemical processing.

It is seen from the above teaching that the present objects have been realized in making available a process by which dangerous and runaway reactions may be employed with safety to secure desirable chemical products. By carrying out the present method in manufacturing vinyl acetate, it is possible to reduce the loss of acetic acid to undesirable by-products below 8% of the total acetic acid consumed, and the loss of acetylene can be held below 6% of the total acetylene reacted.

Other methods of applying the principles of this invention may be employed instead of those explained, changing with respect to reaction conditions and materials employed. Hence, I do not wish to be restricted to the present teaching, excepting insofar as is necessitated by the prior art and the spirit of the appended claims.

What I claim and desire to secure by Letters Patent of the United States is:

1. A conversion process which comprises subjecting acetylene and acetic acid vapors to exothermic catalytic treatment to produce vinyl acetate in a series of stages in the presence of a zinc catalyst, and subjecting the stream of reactants and products to cooling intermediate between catalytic reaction stages, while increasing the mean reaction temperature from stage to stage of the series.

2. A process of catalytic vinylation to provide vinyl acetate which comprises initially heating a stream of acetylene and acetic acid vapors to a temperature below that corresponding to the decomposition of acetylene, thereafter passing the initially heated stream serially through a plurality of catalytic stages at temperatures at which substantial vinylation occurs, and controlling the temperatures in said catalytic stages by cooling the stream of reactants and products between successive catalytic stages, while successively increasing the mean reaction temperature from stage to stage of said series.

3. Process for the production of vinyl acetate which comprises accelerating the reaction over a multi-section catalyst, whereby heat is released in each of said sections and decelerating the reaction by removal of heat, periodically between said catalyst sections the length of the catalyst conduit while increasing the mean reaction temperature from section to section.

4. Process for the production of vinyl acetate which comprises accelerating the reaction of acetic acid and acetylene on a zinc catalyst installed in sections permitting heat to be released, and decelerating the reaction by indirect heat exchange periodically between catalyst sections the length of the catalyst bed whereby the heat release per hour per square foot of catalyst cross section does not exceed twenty-five times the mass velocity while increasing the mean reaction temperature from section to section.

5. Process for the production of vinyl acetate which comprises periodically accelerating the reaction upon the catalyst surface, whereby heat is released by the exothermic reaction and decelerating the reaction by indirect heat exchange whereby the instantaneous temperature rise of the reactants is maintained below the rate of 100° F. per foot of catalyst conduit length.

6. The process of converting acetylene and acetic acid to vinyl acetate which comprises passing the said acetylene and acetic acid in the vapor phase and at vinylation temperature through a plurality of serial catalytic zones intermitted by indirect cooling zones, and progressively increasing the sojourn time in the catalytic zones, whereby the magnitudes of conversion in successive catalytic zones are substantially equivalent.

RALPH R. WENNER.

REFERENCES CITED

The following references are of record in the file of this patent:

UNITED STATES PATENTS

| Number | Name | Date |
| --- | --- | --- |
| 1,822,525 | Herrmann et al. | Sept. 8, 1931 |
| 1,855,367 | Skirrow et al. | Apr. 26, 1932 |
| 2,190,548 | Lucas et al. | Feb. 13, 1940 |
| 2,238,766 | Alberts | Apr. 15, 1941 |
| 2,373,501 | Peterson | Apr. 10, 1945 |
| 2,375,256 | Soday | May 8, 1945 |
| 2,387,557 | Beer et al. | Oct. 23, 1945 |